(12) United States Patent
Tschofenig et al.

(10) Patent No.: US 12,143,911 B2
(45) Date of Patent: Nov. 12, 2024

(54) MACHINE TO MACHINE COMMUNICATIONS

(71) Applicants: ARM LIMITED, Cambridge (GB); ARM IP LIMITED, Cambridge (GB)

(72) Inventors: Hannes Tschofenig, Tirol (AT); Mikko Johannes Saarnivala, Oulu (FI); Szymon Sasin, Oulu (FI); Hanno Becker, Cambridge (GB); Manuel Pegourie-Gonnard, Marseilles (FR)

(73) Assignees: ARM LIMITED, Cambridge (GB); ARM IP LIMITED, Cambridge (GB)

( * ) Notice: Subject to any disclaimer, the term of this patent is extended or adjusted under 35 U.S.C. 154(b) by 295 days.

(21) Appl. No.: 17/595,121

(22) PCT Filed: May 4, 2020

(86) PCT No.: PCT/GB2020/051093
§ 371 (c)(1),
(2) Date: Nov. 9, 2021

(87) PCT Pub. No.: WO2020/229795
PCT Pub. Date: Nov. 19, 2020

(65) Prior Publication Data
US 2022/0217515 A1   Jul. 7, 2022

Related U.S. Application Data

(60) Provisional application No. 62/846,060, filed on May 10, 2019.

(30) Foreign Application Priority Data

Feb. 26, 2020   (GB) ..................................... 2002697

(51) Int. Cl.
*H04W 4/70*   (2018.01)
*H04W 12/0431*   (2021.01)
(Continued)

(52) U.S. Cl.
CPC ......... *H04W 4/70* (2018.02); *H04W 12/0431* (2021.01); *H04W 12/06* (2013.01); *H04W 12/60* (2021.01)

(58) Field of Classification Search
CPC ... H04W 4/70; H04W 12/0431; H04W 12/60; H04W 12/06
(Continued)

(56) References Cited

U.S. PATENT DOCUMENTS 7,778,194 B1   8/2010  Yung
10,805,287 B2*  10/2020  Jung .................. H04L 63/0853
(Continued)

FOREIGN PATENT DOCUMENTS

EP        2254310 A2       11/2010
WO    WO2009055802        4/2009
(Continued)

OTHER PUBLICATIONS

International Search Report and Written Opinion corresponding to PCT/GB2020/051093, dated Jun. 25, 2020.
(Continued)

*Primary Examiner* — Michael S McNally
(74) *Attorney, Agent, or Firm* — DeWitt LLP

(57) ABSTRACT

Broadly speaking, the present techniques relate to a computer implemented method for establishing a secure communication session between a client device and a server resource.

17 Claims, 17 Drawing Sheets

(51) Int. Cl.
*H04W 12/06* (2021.01)
*H04W 12/60* (2021.01)

(58) Field of Classification Search
USPC .............................................................. 726/4
See application file for complete search history.

(56) References Cited

U.S. PATENT DOCUMENTS

| 2003/0229783 | A1* | 12/2003 | Hardt ................... | H04L 63/102 |
| | | | | 713/155 |
| 2016/0234177 | A1* | 8/2016 | Bone ................... | G06F 13/4027 |
| 2020/0104192 | A1* | 4/2020 | Siddhartha .............. | G06F 9/542 |

FOREIGN PATENT DOCUMENTS

| WO | WO2017131564 | 8/2017 |
| WO | 2018/189507 A1 | 10/2018 |

OTHER PUBLICATIONS

Combined Search and Examination Report corresponding to GB2002697.7, dated Sep. 1, 2020.
Examination Report corresponding to GB2002697.7, dated Jul. 14, 2021.
International Preliminary Report on Patentability corresponding to PCT/GB2020/051093, dated Nov. 25, 2021.
Examination Report corresponding to GB1917404.4 dated Feb. 24, 2021.
Combined Search Report and Examination Report corresponding to GB1917404.4 dated May 28, 2020.
International Search Report and Written Opinion corresponding to PCT/GB2020/050279 dated May 4, 2020.
International Preliminary Report on Patentability corresponding to PCT/GB2020/050279 dated Nov. 25, 2021.
Combined Search Report and Examination Report corresponding to GB1901421.6 dated Aug. 1, 2019.
Examination Report corresponding to GB1901421.6 dated Aug. 18, 2020.
Examination Report corresponding to GB1901421.6 dated Apr. 9, 2021.
International Search Report and Written Opinion corresponding to PCT/GB2020/050048 dated Jun. 23, 2020.
International Preliminary Report on Patentability corresponding to PCT/GB2020/050048 dated Aug. 12, 2021.
Oma, "Lightweight Machine to Machine Technical Specification: Core", Jun. 2018 (Jun. 1, 2018), pp. 1-142, XP055672047, Retrieved from the Internet: URL:http://openmobilealliance.org/RELEASE/LightweightM2M/V1 1-20180612-C/OMA-TS-Ligh tweightM2M Core-VI 1-20180612-C.pdf [retrieved—on Feb. 27, 2020] section E.1.
"Lightweight Machine to Machine Technical Specification: Transport Bindings", OMA-TS-Lightweightm2m Transport-V1 1-20180710-A, Open Mobile Alliance (OMA),—4330 La Jolla Village Dr., Suite 110 San Diego, CA 92122; USA, Aug. 6, 2018 (Aug. 6, 2018), pp. 1-67, XP064192961, Retrieved from the Internet: URL:ftp/Publicdocuments/DM/LightweightM2M /Permanent documents/ [retrieved—on Aug. 7, 2018] sections 4., 5.2.4, 5.2.8, 5.2.8.1-5.2.8.4, 6.7.1-6.7.3.
Mateusz Krawiec, "Relation of Binding mode and Security instances in LwM2M 1.1 Issue #459 . OpenMobileAlliance/OMA LwM2M for Developers . GitHub", Mar. 19, 2019 (Mar. 19, 2019), XP055688444, Retrieved from the Internet: URL:https://github.com/OpenMobileAlliance/ OMA LwM2M for Developers/issues/459 [retrieved on— Apr. 22, 2020] section related to contribution dated Mar. 19, 2019.
"3rd Generation Partnership Project, Technical Specification Group Services and System Aspects, Generic Authentication Architecture (GAA); Generic Bootstrapping Architecture (GBA) (Release 15)", 3GPP Standard; Technical Specification; 3GPP TS 33.220, 3rd Generation Partnership Project (3GPP), Mobile Competence Centre , 650, Route Des Lucioles ; F-06921 Sophia-Antipolis Cedex ; France, vol. SA WG3, No. VI5.4.0, Dec. 18, 2018 (Dec. 18, 2018), pp. 1-93, XP051591201, [retrieved on Dec. 18, 2018] the whole document.
Rescorla RTFM E., et al., "Datagram Transport Layer Security Version 1.2; rfc6347.txt", Datagram Transport Layer Security Version 1.2; RFC6347.txt, Internet Engineering Task Force, IETF; Standard, Internet Society (ISOC) 4, Rue Des Falaises CH-1205 Geneva, Switzerland, Jan. 21, 2012 (Jan. 21, 2012), pp. 1-32, XP015081400, [retrieved on Jan. 21, 2012] the whole document.

\* cited by examiner

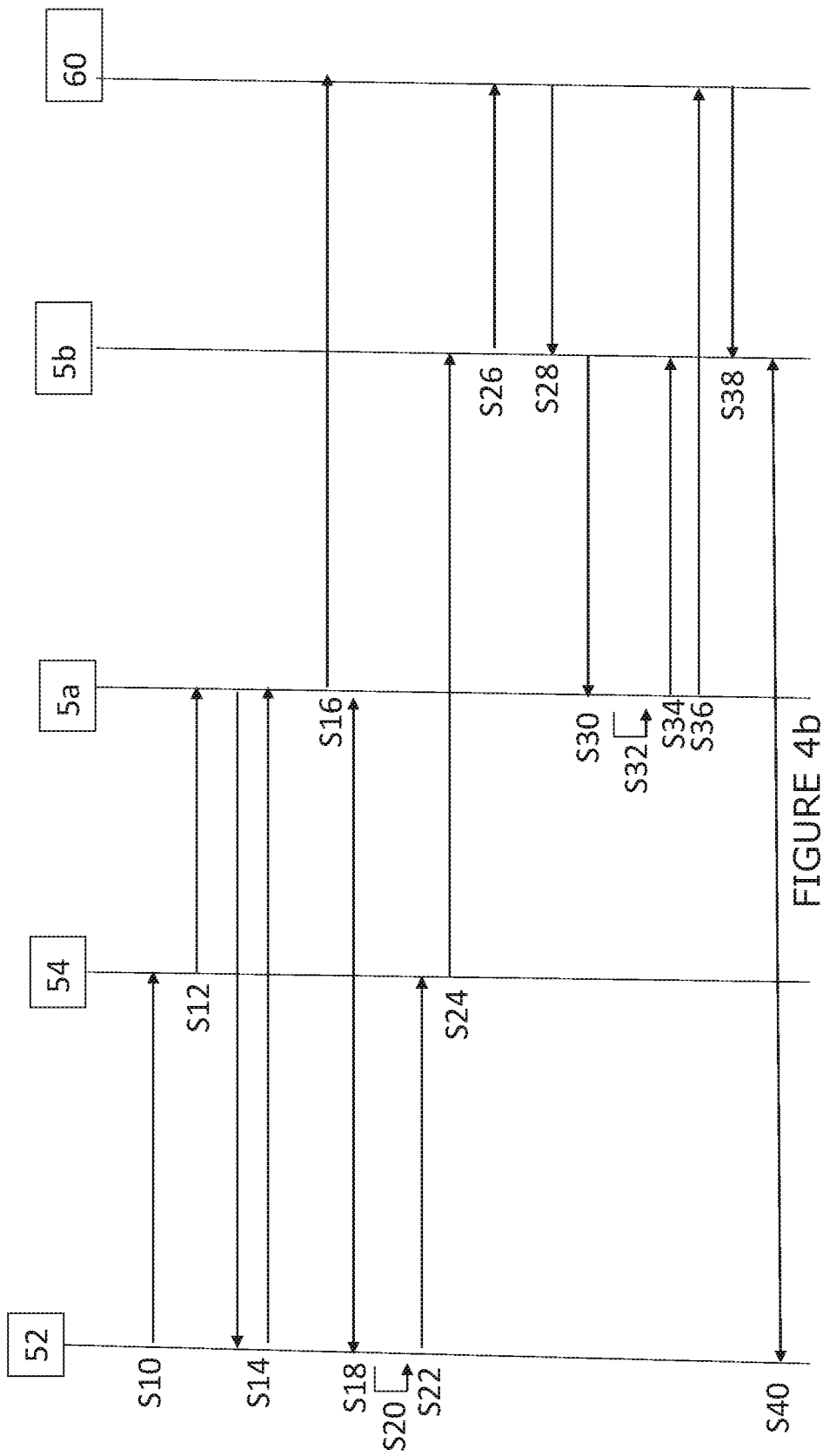

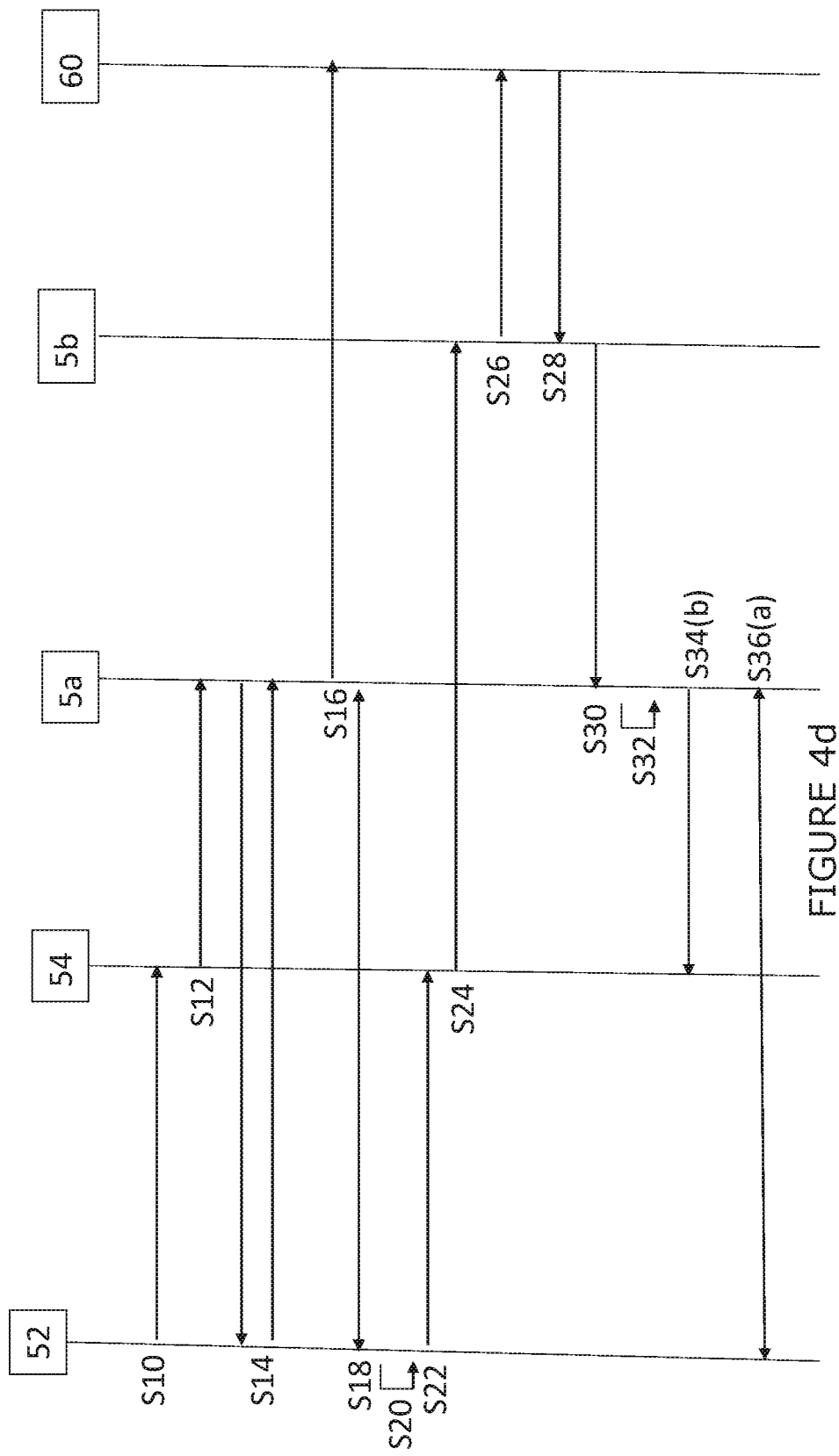

MACHINE TO MACHINE COMMUNICATIONS

The present techniques generally relate to communications between a device and another resource, such as a service or microservice.

There are ever increasing numbers of devices within the home, other buildings or the outdoor environment that have processing and communication capabilities which allow them to communicate with other entities (e.g. devices, servers, services etc.) within the same network or on a different network (e.g. on the internet) to access servers or services as part of the "Internet of Things" (IoT)

For example, a temperature device in a home may gather sensed data and push the sensed data to a remote service (such as an application running in 'the cloud'). The temperature device may then be controlled remotely by the remote service via received command data.

In other examples, a pollution monitoring device in a factory may comprise a sensor to gather information from various chemical sensors and arrange maintenance based on the gathered information; whilst a healthcare provider may use devices comprising sensors, such as a heart rate monitor to track the health of patients while they are at home.

Data is generally transmitted between devices and other entities using machine-to-machine (M2M) communication techniques, and the present applicant has recognised the need for improved (M2M) communication techniques.

According to a first technique there is provided a computer implemented method for establishing a secure communication session between a client device and a first server resource, the method comprising: receiving, at the first server resource from a router resource, a message originating from the client device; determining, at the first server resource based on the content of the message, whether security parameters required to serve the client device are available thereto; when the security parameters are not available: obtaining, at the first server resource, the security parameters; establishing a secure communication session between the first server resource and the client device using the obtained security parameters.

According to a further technique there is provided a computer implemented method for establishing a secure communication session between a client device and a first server resource, the method comprising: receiving, at the first server resource from a router resource, a message originating from the client device; determining, at the first server resource, based on the content of the message, whether security parameters required to serve the client device are available thereto; when the security parameters are not available: determining, at the first server resource, the identity of the server resource currently serving the client device; transmitting update data to the router resource identifying the server resource currently serving the client device.

According to a further technique there is provided a computer implemented method for establishing a secure communication session between a client device and a first server resource, the method comprising: receiving, at the first server resource from a router resource, a message originating at the client device; determining, at the first server resource, based on the content of the message, whether security parameters required to serve the client device are available thereto; when the security parameters are not available: determining, at the first server resource, the identity of the server resource currently serving the client device; transmitting, from the first server resource to the server resource currently serving the client device at least a portion of the content of the message to allow the server currently serving the device to respond to the message.

In a hardware approach, there is provided electronic apparatus comprising logic elements operable to implement the methods of the present technology. In another approach, the computer-implemented method may be realised in the form of a computer program product, tangibly stored in a non-transitory storage medium, and operable in use to cause a computer system to perform the process of the present technology.

The techniques are diagrammatically illustrated, by way of example, in the accompanying drawings, in which.

Figure 4A:
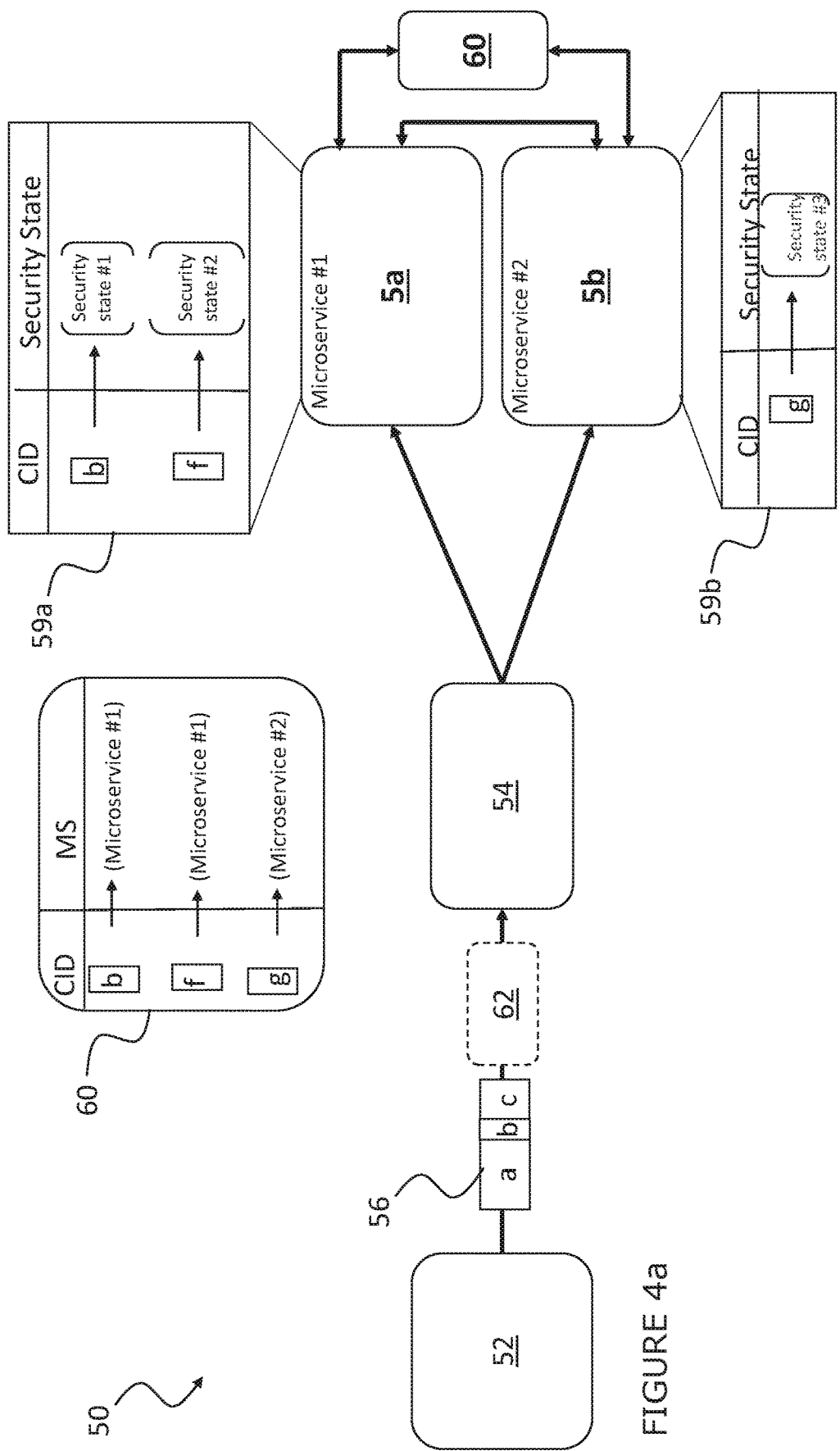
FIG. 4a shows a further illustrative example of a microservice architecture in accordance with the present techniques.
Figure 4C:
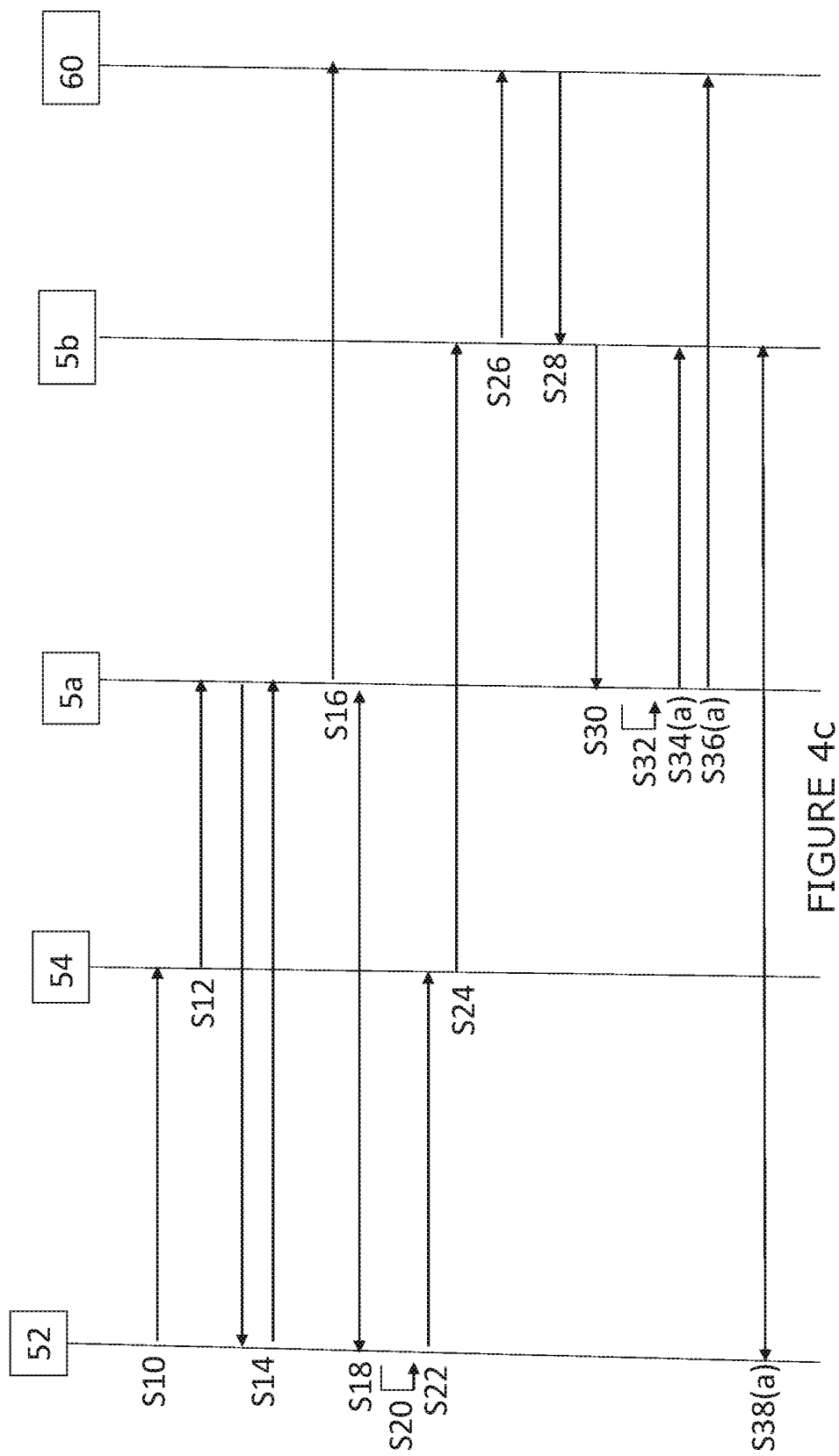
Figure 5A:
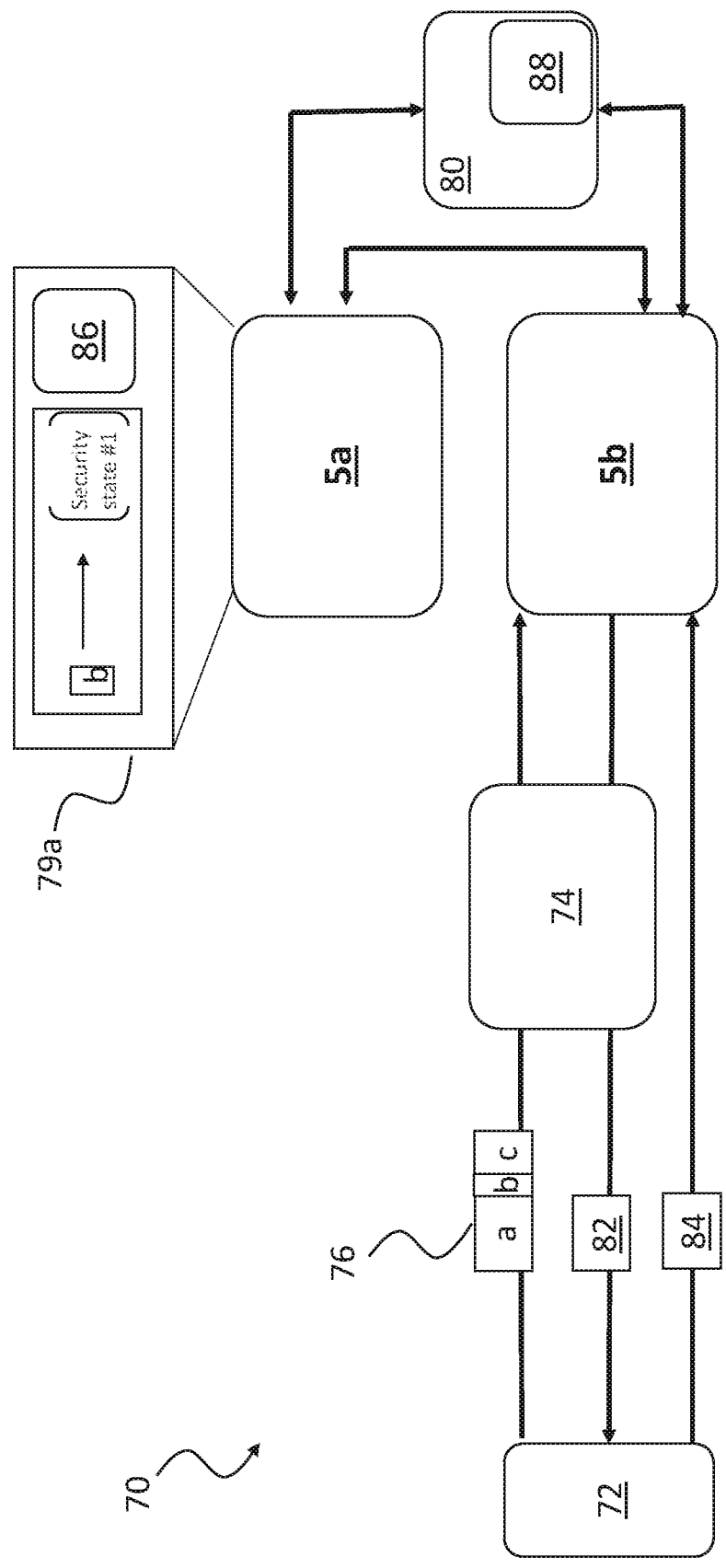
Figure 5B:
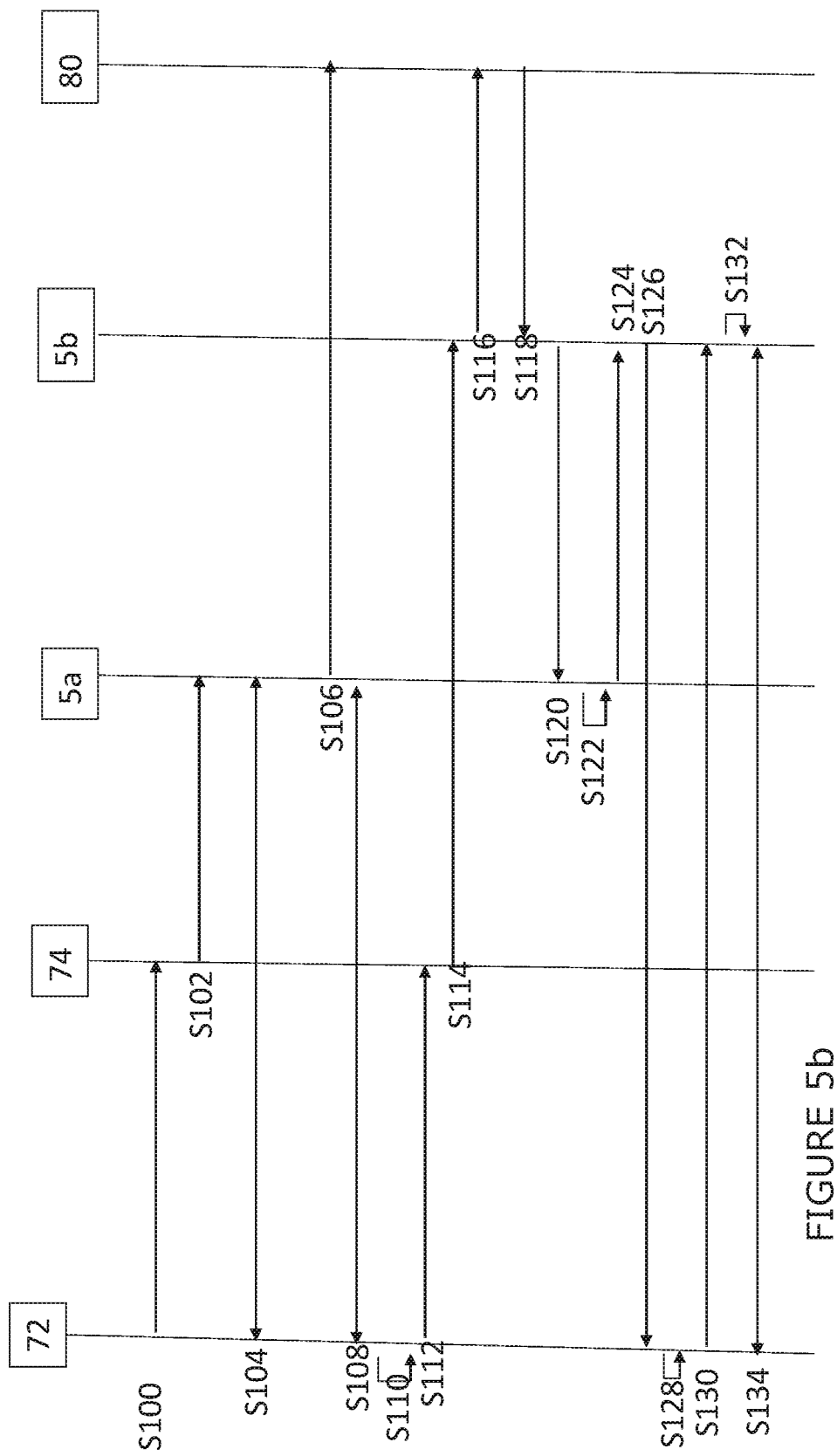
Figure 5C:
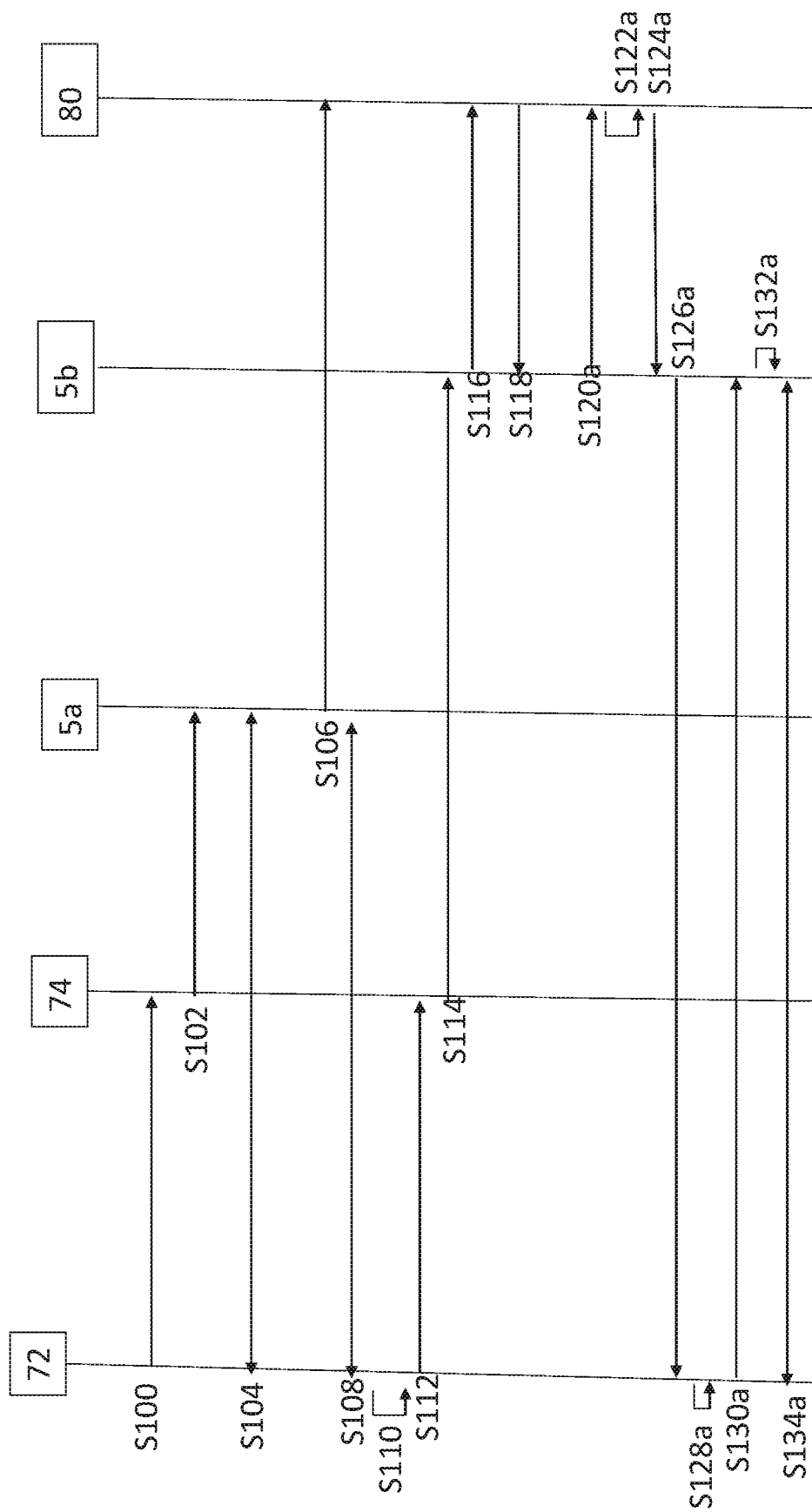
Figure 6:
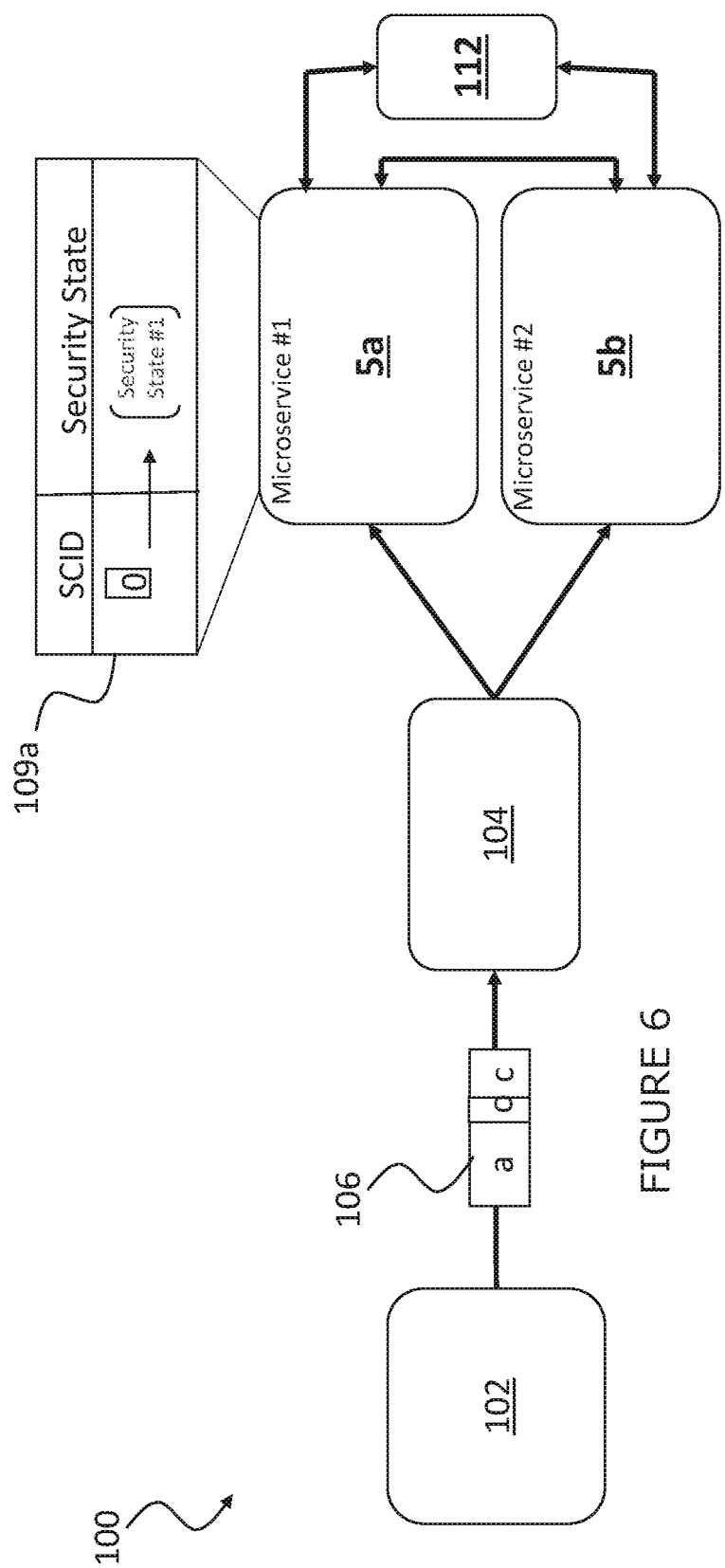

FIGS. 4b-4d illustratively show communications between a client device and microservices in the microservice architecture of FIG. 4a according to illustrative examples of the present techniques;

FIG. 5a shows a further illustrative example of a microservice architecture in accordance with the present techniques;

FIGS. 5b-5c illustratively show communications between a client device and microservices in the microservice architecture of FIG. 5a according to illustrative examples of the present techniques; and FIG. 6 shows a further illustrative example of a microservice architecture in accordance with the present techniques.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter.

Resources such as devices, servers, services, microservices etc. may exchange data using M2M communications whereby different protocols may be used in different environments and in accordance with different requirements.

For example, the Transmission Control Protocol/Internet Protocol (TCP/IP) is a protocol used in communication over the internet. TCP/IP takes care of assembling and disassembling the data to be transmitted in packets. IP handles the addressing so that packets are delivered to the correct destination. Above TCP/IP, the Hypertext Transfer Protocol (HTTP) is used as a client/server protocol. A program may transmit an HTTP request to a server which responds with another HTTP communication.

Resources could also use any suitable protocols for M2M communications including one or more of: IPv6, IPv6 over Low Power Wireless Standard (6LoWPAN®), Constrained Application Protocol (CoAP), Message Queuing Telemetry Transport (MQTT), Representational state transfer (REST), WebSocket, ZigBee®, and Thread®, although it will be appreciated that these are examples of suitable protocols.

M2M communications are typically required to be secure to reduce the risk that malicious third parties gain access to the data by eavesdropping, tampering, or communication forgery. To that end, security protocols may be used by resources to establish a secure communications session between resources, whereby the resources generate/negotiate one or more security parameters to provide secure communications during the secure communications session. Such security parameters may comprise inter alia cryptographic keys (e.g. symmetric and/or asymmetric cryptographic keys) which the resources use to protect data for the duration of a secure communication session, certificates (e.g. X.509) certificates, cipher suites, compression algorithms although the claims are not limited in this respect.

Security protocols may, for example, comprise an authentication key exchange protocol. Such an authentication key exchange protocol may be a handshake such as a handshake used in Transport Layer Security (TLS) or Datagram Transport Layer Security (DTLS). Alternatively, such an authentication key exchange protocol may comprise an Ephemeral Diffie-Hellman Over COSE (EDHOC). It will be appreciated that these authentication key exchange protocols are exemplary only.

Figure 1:
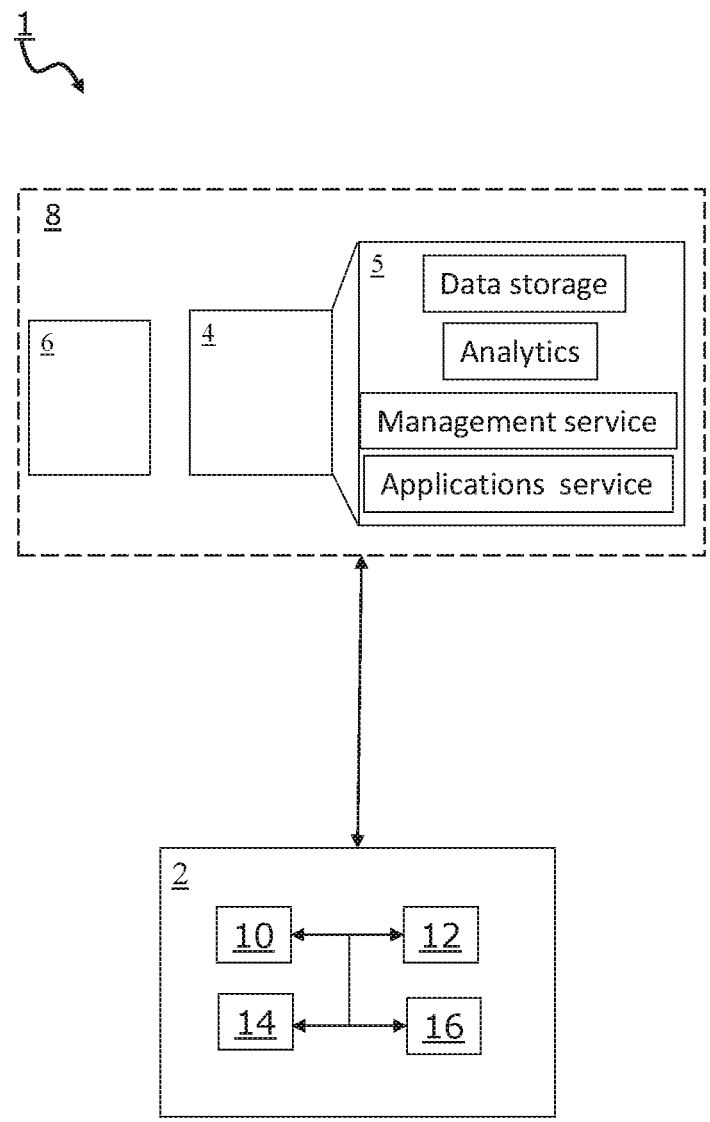
FIG. 1 shows an example deployment scenario for a device according to the present techniques.

FIG. 1 shows a deployment scenario 1 for a device resource 2 (hereafter "client device", "client" or "device") according to the present techniques.

Client device 2 may be a computer terminal, a laptop, a tablet or mobile-phone, or may, for example, be a LwM2M device running an LwM2M client, although the claims are not limited in this respect. Client device 2 can be used to turn objects into "smart-objects" such as streetlights, electric meters, temperature sensors and building automation, healthcare, and a range of other market segments as part of the IoT. It will be appreciated that the market segments listed above are for illustrative purposes only and the claims are not limited in this respect.

Client device 2 is operable to communicate with one or more resources over different protocols. For example, the LwM2M operations can be mapped to CoAP, and the CoAP messages can, in turn, be mapped to HTTP messages. The inverse mapping also applies.

As described herein a server resource (depicted in FIG. 1 as "server 4" and "server 6") may be a single computing device or software running on a computing device. However, the claims are not limited in this respect and the server may comprise a plurality of interconnected computing devices (or software running on a plurality of interconnected devices), whereby the plurality of interconnected computing devices may be distributed over one or more public and/or private networks.

In the present figures server 4 may, for example, be a LwM2M server, an application server, an edge server, a computer terminal, a laptop, a tablet or mobile-phone, or an application hosted on a computing device and/or which provides deployment of one or more resources 5 such as services, microservices, applications etc, depicted in FIG. 1 as "microservices 5". Such microservices 5 may provide various functionality such as data storage; analytics, data management, and applications, although this list is not exhaustive.

Microservices may be implemented using computer-executable instructions in storage circuitry at (or accessible by) the server. In an illustrative example, the microservices are implemented using computer-executable instructions obtained from a non-transitory computer readable medium, such as digital media, including another disc drive, a CD, a CDROM, a DVD, a USB flash drives, a Flash memory, a Secure Digital (SD) memory card, a memory card, without limitation. In a further illustrative example, the microservices are implemented using computer-executable instructions provisioned on the server 4 from another server.

As will be appreciated by a person skilled in the art the microservices may be stored in storage circuitry so as to be separated and protected from unauthorised access by other microservices or non-authorised code (e.g. by means of a hypervisor).

Each microservice may comprise a domain which controls its own domain data and logic and, for example, each microservice may control its own storage to store data which is provisioned thereto or generated thereby.

A microservice may be capable of communications with a client device using client-to-microservice architecture, where, for example, the microservice has a public endpoint with a unique address identifier (e.g. TCP port). The address identifier may map to a router resource, such as a load balancer, which in turn routes or distributes the requests across the microservices as will described in greater detail below.

A microservice may also be capable of communications with another microservice using microservice-to-microservice architecture, where a microservice can transmit a query to one or more other microservices and receive a response.

In the present figure, server 6 comprises a bootstrap server which is operable as a configuration server to provision data on the client device 2 and to provide configuration data operable to configure the client device 2. In embodiments, bootstrap server 6 may be any type of server or remote machine and may not necessarily be a dedicated bootstrap server. Generally speaking, the bootstrap server 6 is any means suitable to perform a bootstrap process with the client device 2 (e.g. machine, hardware, technology, server, software, etc.).

In the present examples, the resources including server 4, bootstrap server 6 and/or microservices 5 may form part of a device management platform 8.

The client device 2 comprises communication circuitry 10 for communicating with the one or more servers 4 and/or services 5.

The communication circuitry 10 may use wireless communication, such as communication such as, for example, one or more of: wireless local area network (Wi-Fi); short range communication such as radio frequency communication (RFID); near field communication (NFC); communications used in wireless technologies such as Bluetooth®, Bluetooth Low Energy (BLE); cellular communications such as 3G or 4G; and the communication circuitry 10 may also use wired communication such as a fibre optic or metal cable. The communication circuitry 10 could also use two or more different forms of communication, such as several of the examples given above in combination.

The client device 2 further comprises processing circuitry 12 for controlling various processing operations performed by the client device 2.

The client device 2 may further comprise input/output (I/O) circuitry 14, such that the client device 2 can receive inputs (e.g. user inputs, sensor inputs, measurement inputs etc.) and/or generate outputs (e.g. audio/visual/control commands etc.).

The client device 2 further comprises storage circuitry 16 for storing data, such as security parameters, whereby the storage circuitry 16 may comprise volatile and/or non-volatile memory.

As above, a client device may use one or more security protocols to authenticate with a resource (e.g. a server, service, microservice etc), whereby the client device may use an authentication key exchange protocol to mutually authenticate with a resource and to negotiate/generate security parameters required to secure communications between the client device and the resource.

In embodiments the authentication key exchange protocol may be a TLS/DTLS handshake, EDHOC or any suitable authentication key exchange protocol to allow the client device and a server resource establish secure communications between one another.

In a TLS/DTLS handshake the server resource creates a per-client security state which comprises or identifies one or more of the security parameters used by the peers to establish the secure communication session. For example, the security state may comprise the cipher suite and compression algorithm negotiated with the client device. The security state is stored in a security parameter database in storage accessible to the server resource.

The server resource may provide a connection identifier (CID) to the client device during the handshake, whereby the CID is an identifier (e.g. comprising one or more bytes) carried in a message from the client device that allows the server resource identify the corresponding security state, and therefore, the security parameters required to serve the client device during a secure communication session.

Figure 2A:
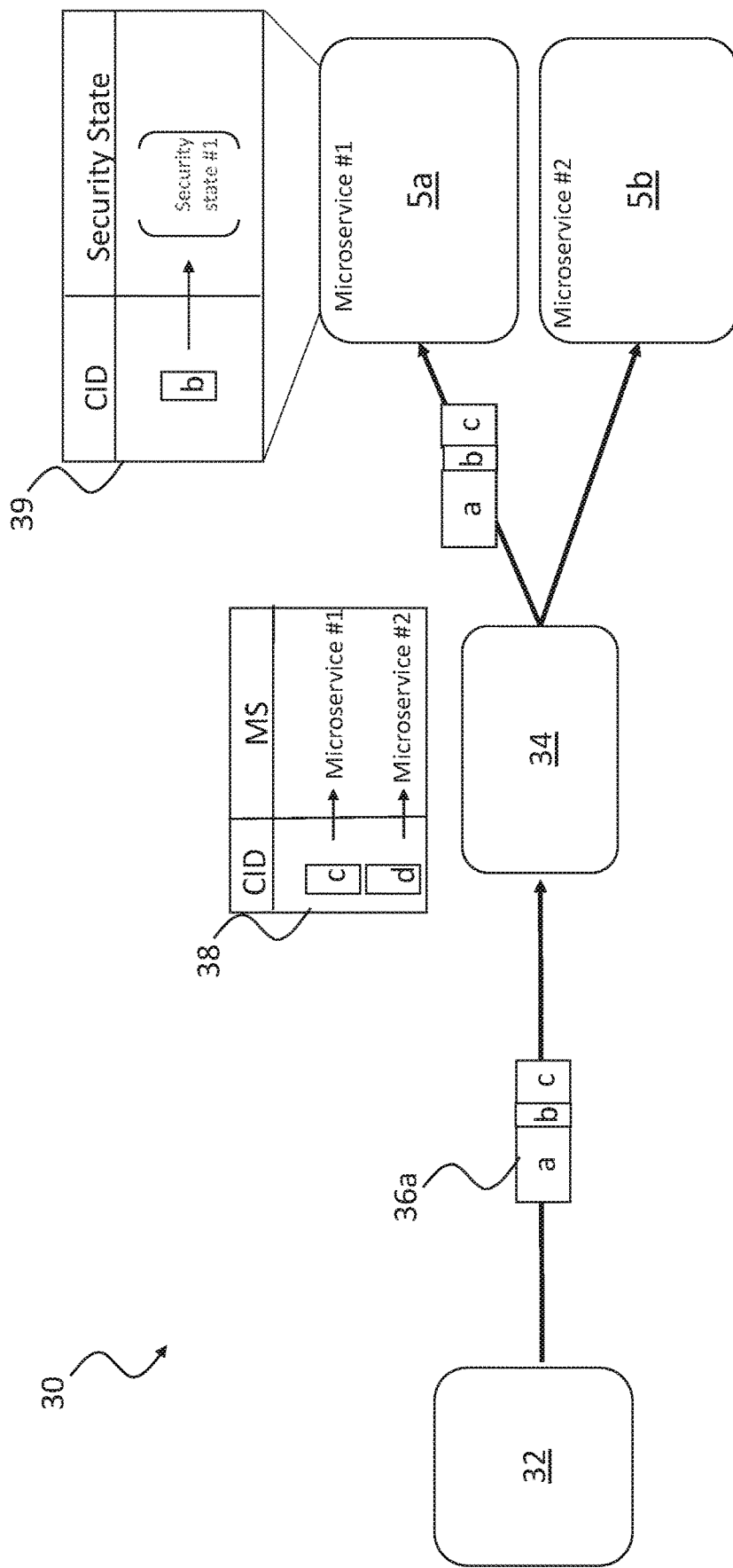
FIG. 2a shows an illustrative example of a microservice architecture.
Figure 2B:
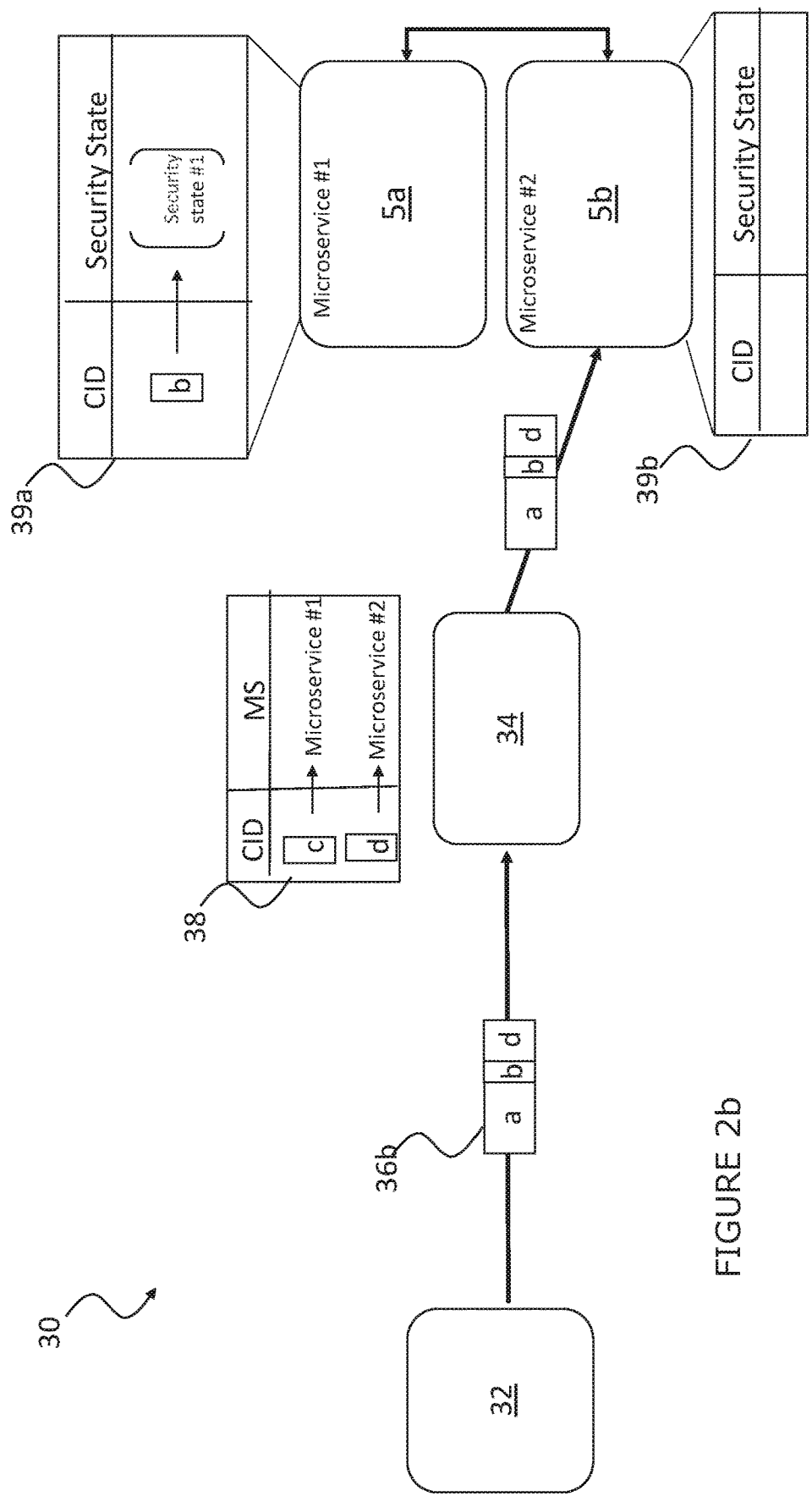
FIG. 2b shows the microservice architecture of FIG. 2a according to a further illustrative example.
Figure 2C:
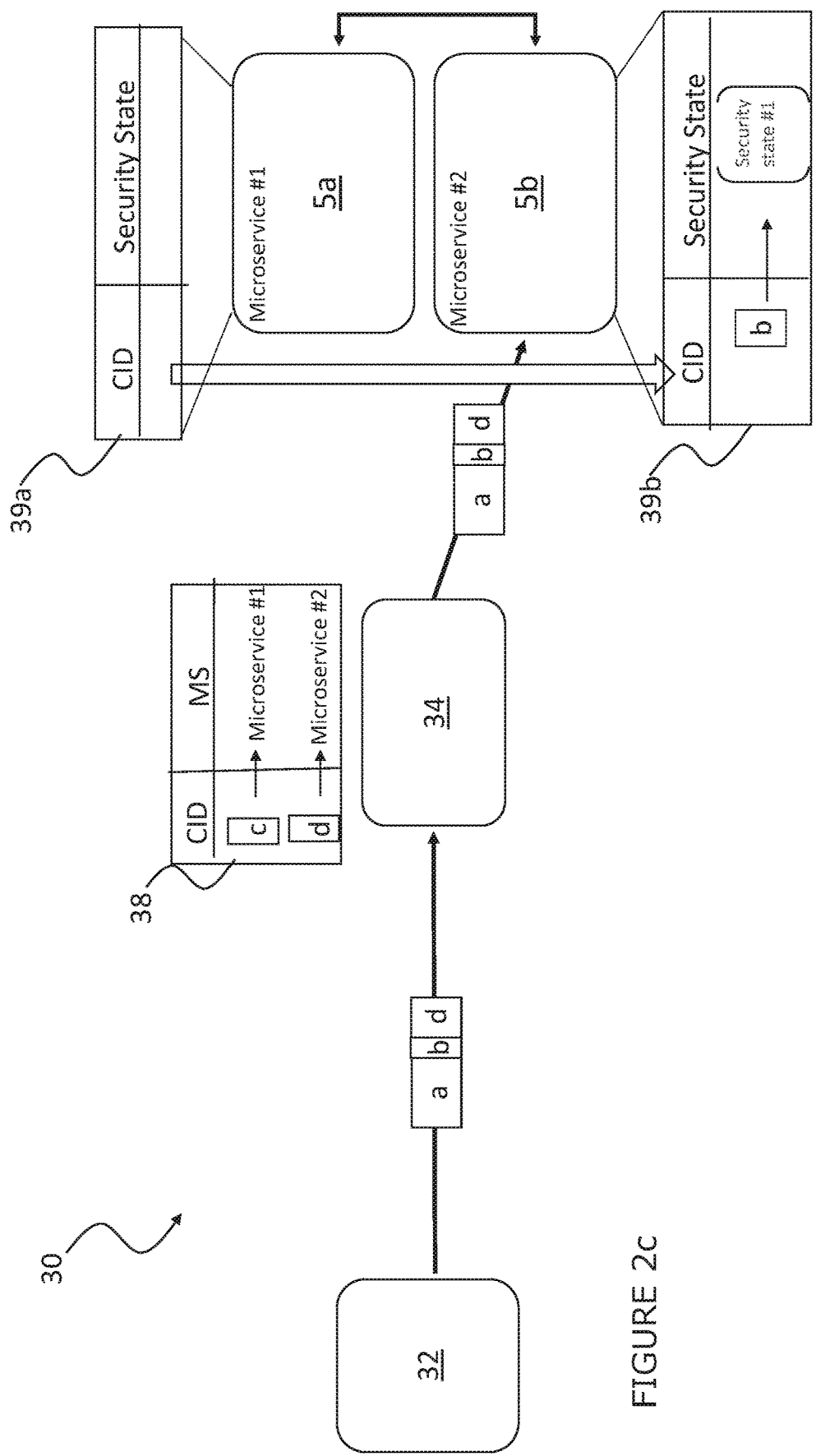
FIG. 2c shows the microservice architecture of FIG. 2a according to a further illustrative example.
Figure 2D:
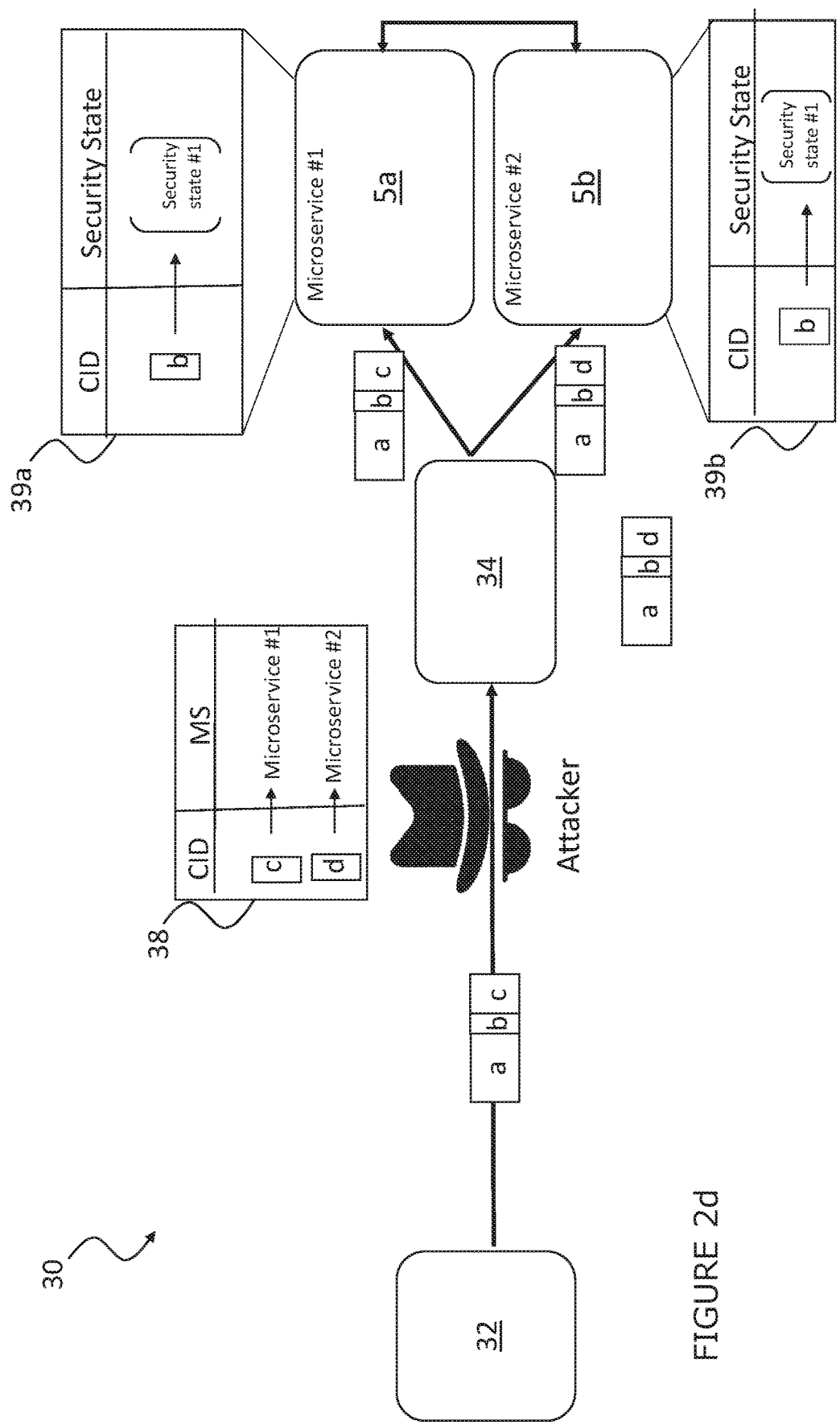
FIG. 2d shows the microservice architecture of FIG. 2a according to a further illustrative example.

FIG. 2a shows an illustrative example of a microservice architecture 30; FIG. 2b shows the microservice architecture 30 according to a further illustrative example; FIG. 2c shows the microservice architecture 30 according to a further illustrative example; FIG. 2d shows the microservice architecture 30 according to a further illustrative example.

In FIGS. 2a-2d client device 32 communicates with server resources (depicted as microservices 5a and 5b) via a router resource (depicted as load balancer 34). As above, client device 32 may use an authentication key exchange protocol to negotiate or generate one or more security parameters. In the present illustrative example, the authentication key exchange protocol comprises a TLS/DTLS handshake.

When client device 32 communicates with a microservice the client device 32 generates a message 36 comprising a payload (a), a CID (b), and address data (c) (e.g. specifying a Universal Resource Identifier (URI), such as an IP address and port).

The load balancer 34 comprises a database 38 defining a load balancer state, which comprises a mapping between the address data and a corresponding destination (e.g. microservices 5a and 5b) to which the message is to be routed. The load balancer 34 receives the message 36a from the client device and routes the message to the destination in accordance with the load balancer state 38.

In the present illustrative example of FIG. 2a, the destination is microservice 5a. On receiving the message 36a from the load balancer 34 the microservice 5a attempts to use the CID (b) in the message 36a to identify the appropriate security state for securely communicating with the client device in the security parameter database 39a. In FIG. 2a CID (b) corresponds to a security state #1, and the client device 32 and microservice 5a communicate using the previously negotiated security parameters identified by the corresponding security state #1.

As shown in FIG. 2b, the message 36b comprises address data (d), which is different to that in the message 36a depicted in FIG. 2a. In the illustrative example the load balancer 34 receives the message 36b from the client device 32 and routes the message 36b to the destination resource in accordance with the load balancer state 38. In the present illustrative example, the destination resource is microservice 5b.

On receiving the message 36b from the load balancer 34 the microservice 5b attempts to use the CID (b) in the message 36b to identify the appropriate security state for communicating with the client device 32 in the security parameter database 39b. Given there is no corresponding security state for CID (b) in the security parameter database 39b the microservice 5b cannot communicate with the device 32 and the client device may perform a handshake with microservice 5b if a secure communication session is to be established between the client device 32 and microservice 5b.

In a further illustrative example, rather than performing a handshake, the microservice 5b may query a further resource (not shown in FIG. 2b) to determine the server resource currently serving the client device.

When the microservice determines the identity of the server resource currently serving resource it may communicate therewith to request the security parameters required to securely communicate thereby serving the client device.

Thus, as depicted in FIG. 2c, microservice 5a transfers security state #1 comprising the security parameters to microservice 5b, whereby the security state #1 comprising the security parameters is stored in security parameter database 39b. Microservice 5b can then securely communicate with the client device using the security parameters of the security state #1.

As illustratively shown in FIG. 2d, an attacker may perform a denial of service (DoS) attack by intercepting messages from the client device 32 and actively changing the address data to cause the microservices 5a and 5b to transfer the security state back and forth for every message. The attacker may also generate messages with address data to cause the microservices 5a and 5b to transfer the security state for every message generated by the attacker. Such functionality will be burdensome and may exhaust the resources on the device management platform.

In FIGS. 3a-3d client device 42 communicates with server resources (depicted as microservices 5a and 5b) via a router resource (depicted as load balancer 44). As above, client device 42 may use an authentication key exchange protocol to negotiate or generate various security parameters for a secure communications session. In the present illustrative example, the authentication key exchange protocol comprises a TLS/DTLS handshake. Client device 42 communicates with a microservice 5a by generating a message 46 comprising a payload (a), a CID (b), and address data (c) (e.g. specifying a URI such as IP address and port).

The load balancer 44 comprises a database 48 defining a load balancer state, which comprises a mapping between the CID and a corresponding destination (e.g. a microservice) to which the message is to be routed. Such a mapping in the database 48 may be updated by a microservice after it establishes a security state following generating or negotiating security parameters with the client device 42. Load balancer 44 receives the message 46a from the client device and routes the message to the destination resource in accordance with the load balancer state 48. In the present illustrative example, the destination resource is microservice 5a.

On receiving the message 46a from the load balancer 44 the microservice 5a uses the CID (b) in the message 46a to identify the appropriate security state in the security parameter database 49a.

Figure 3A:
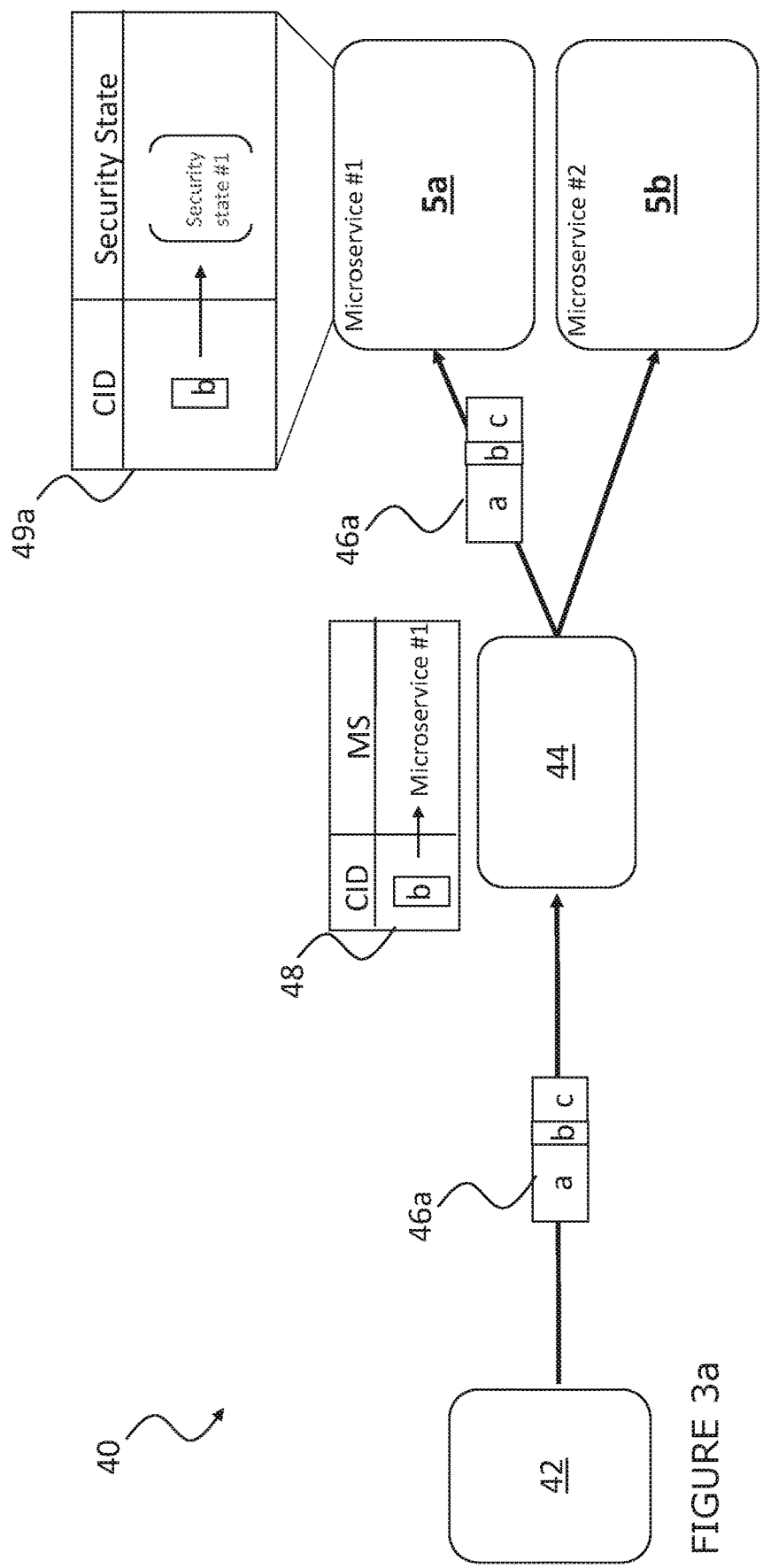
FIG. 3a shows an illustrative example of a microservice architecture according to the present techniques.

In the present illustrative example of FIG. 3a, CID (b) corresponds to a security state #1, and the client device 42 and microservice 5a communicate using the previously negotiated security parameters of the security state #1.

Figure 3B:
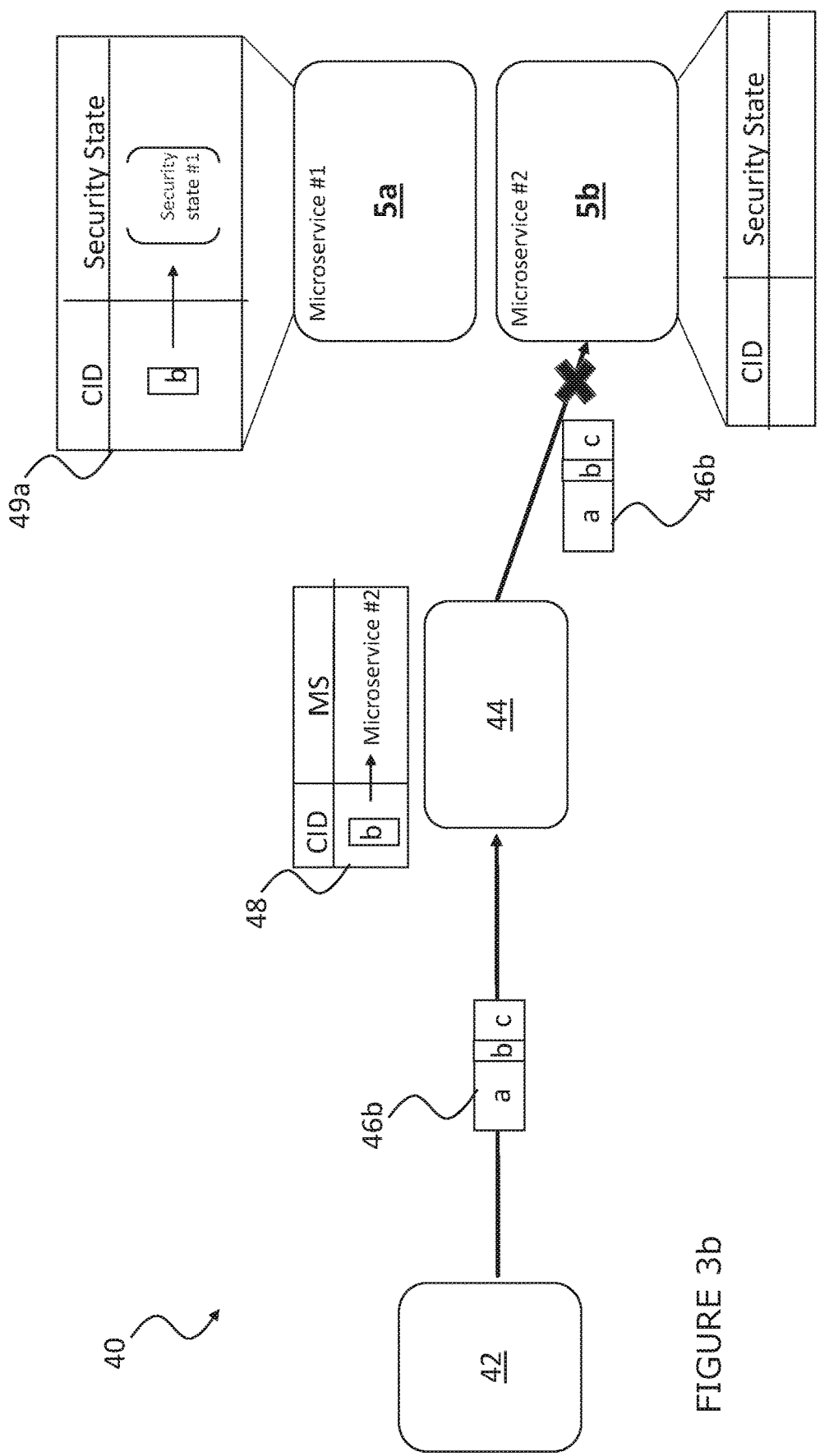
FIG. 3b shows the microservice architecture of FIG. 3a according to a further illustrative example of the present techniques.
Figure 3C:
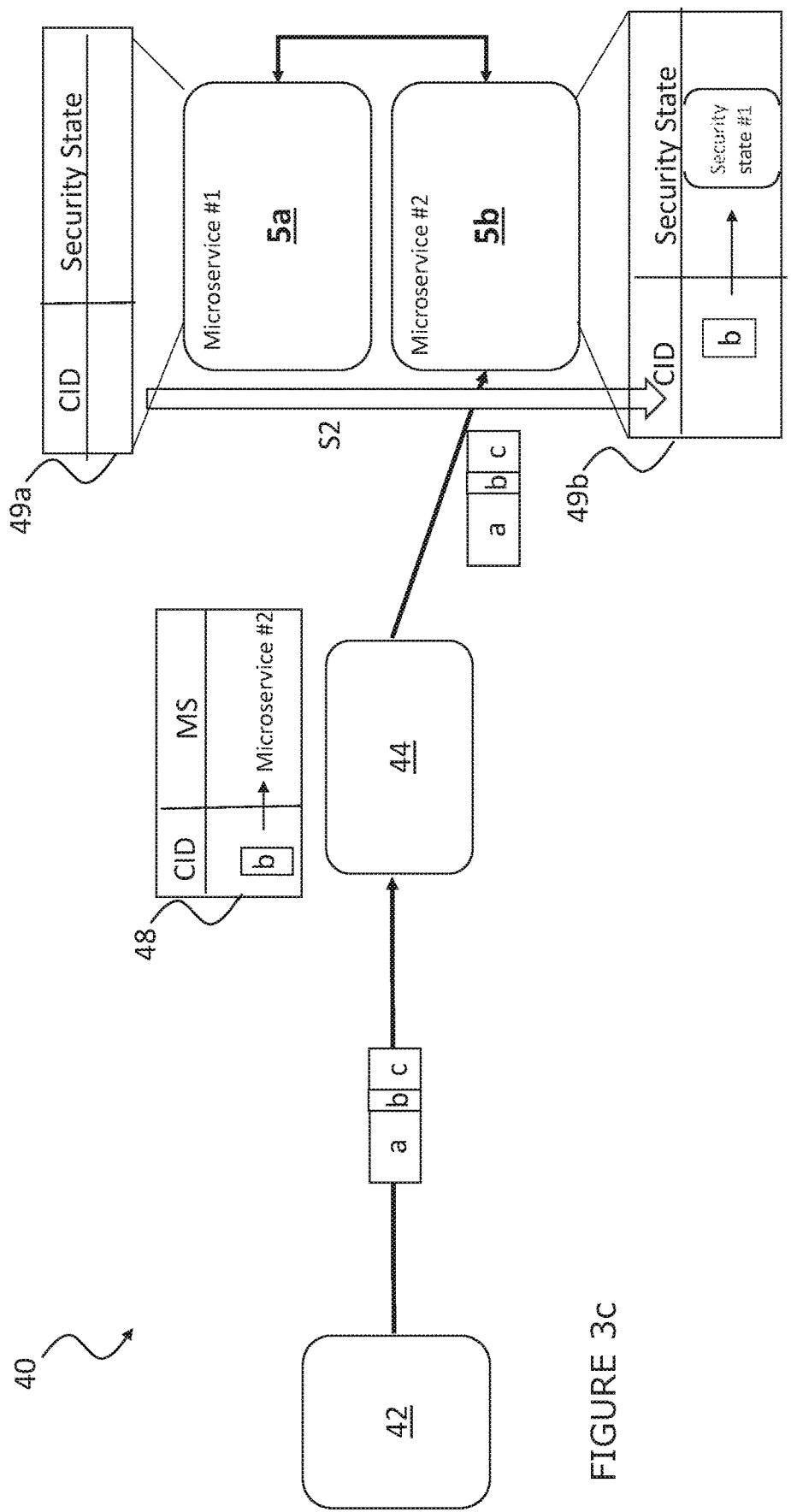
FIG. 3c shows the microservice architecture of FIG. 3a according to a further illustrative example of the present techniques.

As depicted in FIG. 3b, the message 46b comprises CID (b) and the load balancer 44 routes the message 46b to the destination resource in accordance with the CID (b) as specified by the load balancer state 48.

In the present illustrative example of FIG. 3b, the destination resource is microservice 5b. On receiving the message 46b from the load balancer 44 the microservice 5b attempts to use the CID in the message 46b to identify the appropriate security state for communicating with the client device 42 in the security parameter database 49b. Given there is no corresponding security state for CID (b) in the security parameter database 49b the microservice 5b cannot communicate with the device 42 using existing security parameters, and the client device 42 may perform a handshake with microservice 5b if communication is to be established between the client device 42 and microservice 5b.

In a further illustrative example, rather than performing a handshake, the microservice 5b may query the microservice 5a as to whether the security state for CID(b) is present in the security parameter database 49a. When the security state is present at microservice 5a the microservice 5a may transfer the security state #1 comprising the security parameters to microservice 5b, whereby the security state #1 comprising the security parameters is stored in security parameter database 49b. The client device 42 and microservice 5b can then communicate using the security parameters of the security state #1 in the security parameter database 39b.

Figure 3D:
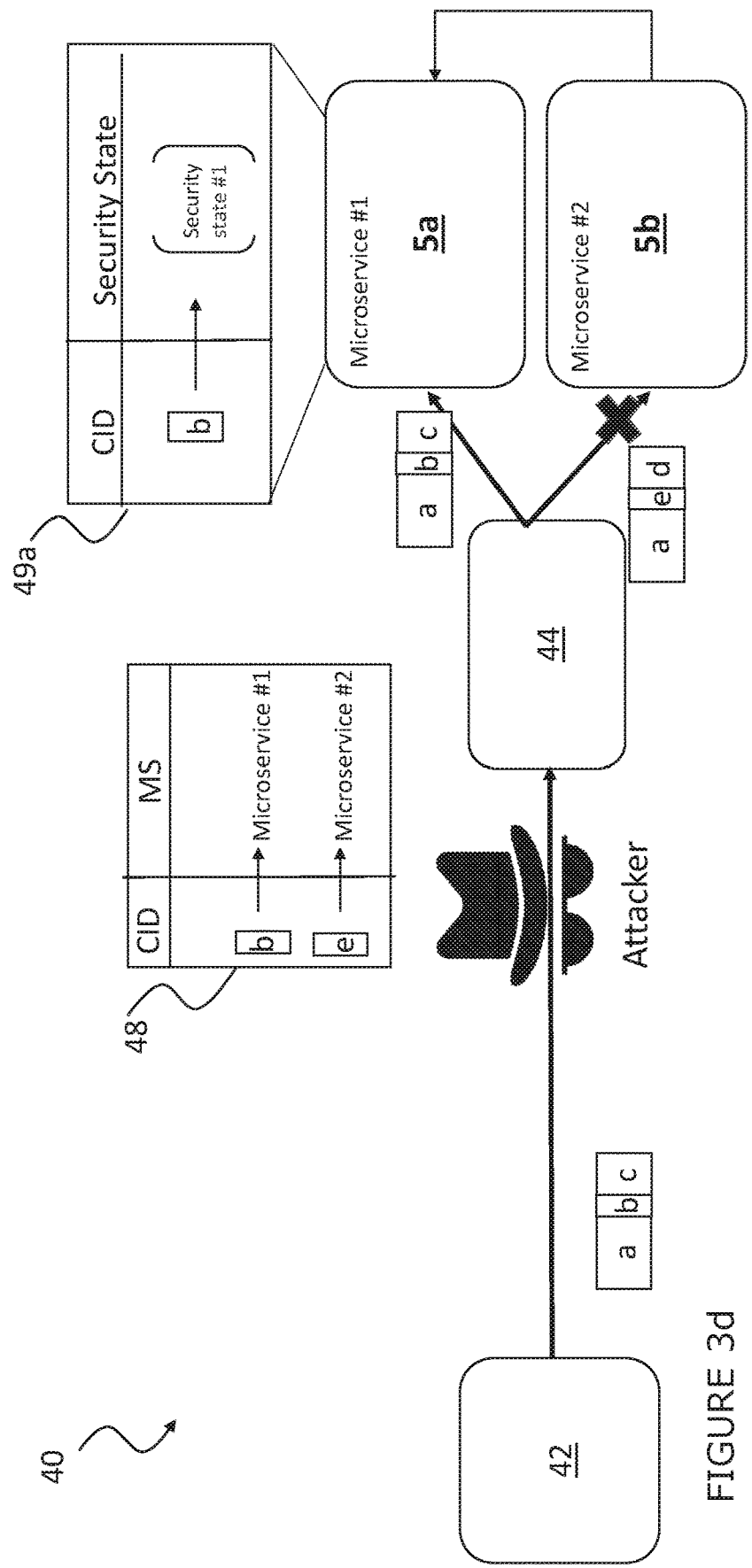
FIG. 3d shows the microservice architecture of FIG. 3a according to a further illustrative example of the present techniques.

As illustratively shown in FIG. 3d, an attacker may perform an attack (e.g. DoS) by intercepting messages from the client device 42 and actively changing the CID to cause the microservices to continuously query each other for the security state based on the incoming CID for every message. Such functionality will be burdensome on the resources at the device management platform because, for example, if the attacker specifies a CID which is not allocated then the microservice receiving the query will perform a search of its security parameter database but will never find a corresponding CID. Similarly, the querying device will generate queries for another microservice but will not receive a correct CID.

A potential problem with using a load balancer to route messages in accordance with the CID (as generally described at FIGS. 3a-3d) rather than address data (as generally described at FIGS. 2a-2d) is that modifying the functionality of the load balancer to route using CIDs may be difficult because load balancers may be owned by a party that does not authorise such modifications, or the load balancers may have specialised circuitry (e.g. FPGAs) or code (low-level code) that may not readily support such functionality without significant modifications FIG. 4a shows an illustrative example of a microservice architecture 50 in accordance with the present techniques. FIGS. 4b-4d illustratively show communications between a client device 52 and server resources in the microservice architecture 50 according to illustrative examples of the present techniques.

In FIGS. 4a-4d client device 52 communicates with server resources (depicted as microservices 5a and 5b) via a router resource (depicted as load balancer 54). As above, client device 52 may use an authentication key exchange protocol with a server resource to negotiate or generate various security parameters for a secure communications session. The client device 52 generates a message 56 comprising a payload (a), a CID (b), and address data (c) (e.g. specifying a URI such as IP address and port). In FIGS. 4a-4d the load balancer is depicted as routing the message 56 based on the address data as specified by the load balancer state (not shown), although the load balancer could also route messages based on the CID.

The microservice architecture 50 further comprises a security database 60 which registers a mapping between the CID and the microservice that is currently serving the client device). The security database 60 may communicate with the microservices to receive updates of the mappings therein, and to receive and respond to queries about the mappings therein. The security database 60 may be a resource at the device management platform and may, for example comprise an application, service or microservice etc.

In operation, client device 52 generates a message comprising a payload and address data and transmits the message such that it is received at the load balancer (S10). The message may have a null value for a CID or may have a value to indicate that the client device has not yet received a CID.

The load balancer 54 routes the message to the destination resource in accordance with the load balancer state (S12). In the present illustrative example, the destination resource is microservice 5a.

The client device 52 and microservice 5a perform an authentication key exchange protocol (S14) and generate or negotiate security parameters. The microservice 5a allocates a CID for a security state comprising or identifying the security parameters and instructs the security database 60 to update the mapping between the CID and the microservice serving the device (S16). The client device 52 and microservice 5a can then communicate using the security parameters (S18).

At some point the address data in the messages originating from the client device may change. For example, the client device may be a mobile device that switches networks, or a user may switch from wi-fi to a mobile network (S20).

The client device 52 generates a message comprising a payload, CID and address data for the server resource and transmits the message such that it is received at the load balancer (S22). The load balancer 54 routes the message to the destination resource in accordance with the load balancer state (S24). In the present illustrative example, the destination resource is microservice 5b.

As a non-null-value CID is present in the message and CID is not in security parameter database 59b, the microservice 5b transmits a query communication to the security database 60 to check which microservice is currently serving the client device 52 (S26), whereby the security database 60 responds confirming that microservice 5a is currently serving the client device (S28). Such a query communication may comprise the connection identifier of the message which the security database can use to check the mappings therein. The response communication from the security database 60 may confirm the identity of the server resource currently serving the client device, whereby such a response may include address data for the microservice currently serving the client device.

Microservice 5b then transmits a query to microservice 5a to check whether the message is valid. Such a query may include the original message received from the load balancer (S30).

Microservice 5a checks whether the message is valid (S32).

When the message is not valid the microservice 5a may respond to the query, confirming that the message is not valid and the microservice 5b can take an action such as shutting down or ignoring further communications having the same CID.

When the message is valid the microservice 5a may, as depicted in the embodiment of FIG. 4b, respond to the query confirming that the message is valid (S34). Additionally, or alternatively, the microservice 5a may transmit the security parameters to the security database 60, deleting the security parameters from security parameter database 49a and may further instruct the security database 60 to amend the mapping for the CID so that microservice 5b is registered as the server resource currently serving the device (S36).

The security database 60 then transmits the security state to microservice 5b (S38), such that microservice 5b stores the security state at security parameter database 59b. Such functionality will avoid the security parameters being duplicated and stored at different resources which may reduce the opportunity for an attacker to gain access to the security state. The microservice 5b can then communicate with the client device 42 in a secure manner using the security parameters of the security state (S40).

In a further embodiment, as depicted in the embodiment of FIG. 4c, when microservice 5a determines that the message is valid (S32) the microservice 5a may transmit the security state directly to microservice 5b (S34(a)). Such direct transmission between microservices 5a/5b may be achieved by establishing a communications channel between the microservices 5a/5b. The microservice 5b may then store the security state received from microservice 5b at security parameter database 59b. The microservice 5a may also instruct the security database 60 to amend the mapping for the CID so that microservice 5b is registered as serving the device (S36a).

Such functionality means that the security database 60 does not have to store or route the security parameters which may be required to be stored securely. The microservice 5b can then communicate with the client device 42 in a secure manner using the security parameters of the security state (S38(a)).

In a further embodiment, as depicted in the embodiment of FIG. 4d, when microservice 5a determines that message is valid (S32) the microservice 5a may instruct the load balancer to update the mapping of the load balancer state such that the address data of any future message having the same address data as that in the message sent from the client device (as at S22) is routed to microservice 5a rather than to microservice 5b (S34(b)). The microservice 5a can then continue to communicate with the client device 42 using the negotiated security parameters of the security state (S36b). Such functionality means that the security state does not have to be provisioned to microservice 5b which may reduce the opportunity for an attacker to gain access to the security state. Updating the load balancer state also reduces the amount of communications between microservices.

The functionality described in FIGS. 4b-4d means that messages can be transmitted from the client device 52 to a remote device 62 (e.g. a proxy or gateway) between the client device and load balancer, and a new connection is not required to be established between the client device and the microservice that responds to the message. Looking at the remote device 62 in FIG. 4a, which is optional, the client device 52 transmits a message to the remote device 62 and the client device can proceed to enter a sleep mode after the message is sent.

The message may be cached or queued at the remote device 62 and sent to the load balancer at an appropriate time. As the security state or the load balancer state is managed such that a microservice can serve the client device using security parameters from a previously negotiated security state, the client device does not have to be online to negotiate or generate various security parameters for a secure communications session. A message from the serving microservice can, in turn, be cached at the remote device and forwarded to the client device when it returns from sleep mode. The client device can then decrypt/verify the message using the previously negotiated security parameters stored thereon.

FIG. 5a shows a further illustrative example of a microservice architecture 70 in accordance with the present techniques and FIGS. 5b-5c illustratively show communications between a client device 72 and server resources in the microservice architecture 70 according to illustrative examples of the present techniques.

In FIGS. 5a-5c client device 72 communicates with server resources (depicted as microservices 5a and 5b) via a router resource (depicted as load balancer 74). As above, client device 72 may use an authentication key exchange protocol with the server resource to negotiate or generate various security parameters for a secure communications session.

The client device 72 generates a message 76 comprising a payload (a), a CID (b), and address data (c) (e.g. specifying a URI such as IP address and port). The operation of the load balancer 74 is substantially similar to that described in FIGS. 4a-4d above, whereby load balancer 74 is depicted as a router resource routing messages based on the address data as specified by the load balancer state, although the load balancer 74 could also route messages based on the CID.

The microservice architecture 70 further comprises a security database 80 which registers a mapping between the CID and the server resource that is currently serving the client device. The security database 80 may communicate with the microservices to receive updates of the mappings therein, and to receive and respond to queries about the mappings therein. The security database 80 may be a resource at the device management platform and may, for example comprise an application, service or microservice etc.

In operation, client device 72 generates a message comprising a payload and address data and transmits the message such that it is received at the load balancer (S100). The message may have a null value for a CID or may have a value to indicate that the client device has not yet received a CID.

The load balancer 74 routes the message to the destination resource specified by the address data in accordance with the load balancer state (S102). In the present illustrative example, the destination resource is microservice 5a.

The client device 72 and microservice 5a perform an authentication key exchange protocol (S104) and generate or negotiate security parameters. The microservice 5a allocates a CID for a security state comprising or identifying the security parameters and instructs the security database 80 to update the mapping between the CID and the microservice serving the device (S106). The client device 72 and microservice 5a can then communicate using the security parameters (S108).

At some point the address data in the messages originating from the client device may change. For example, the client device may be a mobile device that switches networks, or a user may switch from wi-fi to a mobile network (S110).

The client device 72 generates a message comprising a payload, CID and address data and transmits the message such that it is received at the load balancer (S112). The load balancer 74 routes the message to the destination resource in accordance with the load balancer state (S114). In the present illustrative example, the destination resource is microservice 5b.

As a non-null-value CID is present in the message, and CID is not in security parameter database 79b, the microservice 5b transmits a query communication to the security database 80 to check which microservice is currently serving the client device 72 (S116), whereby the security database 80 confirms that microservice 5a is currently serving the client device (S118). Such a query communication may comprise the connection identifier of the message which the security database can use to check the mappings therein. The response communication from the security database 80 may confirm the identity of the server resource currently serving the client device, whereby such a response may include address data for the microservice currently serving the client device.

In embodiments, before obtaining the security parameters, the microservice 5b performs a return routability check using a challenge response exchange with the client device to check that the message originated from a trusted device and not a rogue 3rd party attempting to perform an attack (e.g. a DoS attack). An example of a suitable return routability check is performing a challenge response exchange with the peer from which message 106 originated. Such a challenge response exchange may comprise exchanging a cookie comprising data encrypted using one or more of the security parameters established between the client device and the server resource currently serving the client device.

As an illustrative example the microservice 5b requests a cookie from the microservice currently serving the client device (depicted as microservice 5a) (S120). Microservice 5a generates the cookie (S122) and transmits the cookie to the microservice 5b (S124). Microservice 5b then transmits the message 82 comprising the cookie to client device (S126). Client device processes the cookie (S128) and transmits message 84 comprising a response to the challenge to microservice 5b (S130). Microservice 5b validates the cookie (S132). Such validation may comprise transmitting the received cookie to the microservice 5a for checking and receiving confirmation that the cookie is valid.

In the illustrative example of FIG. 5c the microservice 5b requests the cookie from the security database 80 (S120a). The security database 80 checks the mappings for the CID and generates the cookie (S122a) using, for example, one or more of the security parameters in the mapping which may be provisioned thereat by the microservice currently serving the client device or whereby the security device may request the microservice currently serving the client device to generate the cookie.

The security database then transmits the cookie to the microservice 5b (S124a). Microservice 5b then transmits the message 82 comprising the cookie to client device 72 (S126a). Client device 72 processes the cookie (S128a) and transmits message 84 comprising a response to the challenge to microservice 5b (S130a). Microservice 5b validates the cookie (S132a). Such validation may comprise transmitting the received cookie to the security database 80 for checking.

In a further illustrative example, the microservice 5b may obtain one or more security parameters corresponding to the CID in the message and generate the cookie itself. Such security parameters may be obtained from, for example, the microservice 5a which is currently serving the client device or from the security database 80. The microservice 5b can then transmit the generated cookie to the client device 72 for processing. Obtaining a generated cookie or the security parameters from the security database 80 avoids communications between the microservice 5b and microservice 5a.

Although the messages 82, 84 are depicted as being sent between the microservice 5b and client device 72, it will be appreciated that the messages will include a CID and address data, so may be routed to the appropriate destination specified by address data in the messages by, for example a router resource (e.g. load balancer 74).

In embodiments and when the cookie is not validated, microservice can shut down.

In embodiments and when the cookie is validated, microservice 5b may obtain the security parameters (e.g. direct from the microservice currently serving the device or from the security database 80). The microservice 5b can then serve the client device 72 using the provisioned security parameters (S134/134a). Alternatively, when the cookie is validated, microservice 5a may instruct the load balancer to update the mapping of the load balancer state such that any future messages having address data corresponding to the address data in the message (at S112) is routed to the microservice currently serving the device (microservice 5a) rather than to microservice 5b.

In embodiments, the cookie comprises one or more challenge parameters which the client device uses to generate a response which can be validated by the microservice. In an illustrative example the one or more challenge parameters comprise a random number or nonce encrypted using, for example, a cryptographic key of the security parameters negotiated between the client device and the microservice currently serving the client device. The challenge is for the client device to decrypt the random number or nonce using a corresponding cryptographic key and to return the value of the decrypted nonce as a response to the challenge.

The challenge response exchange provides a return routability check because a valid response to the challenge from the client device means that the original message is from a valid source. Furthermore, a valid response to the challenge indicates that the client device has the necessary security parameters to process the cookie correctly.

The message transmitted from the microservice to the client device may also include a "freshness parameter" to provide replay protection. In an illustrative example the freshness parameter comprises a counter or sequence number.

As will be appreciated, messages exchanged between the client device and the microservice currently serving the client device (Microservice 5a in FIGS. 5a-5c) during a communication session will include a session specific counter value, whereby the session specific counter value is generated by a counter 86 stored in, for example, the security parameter database 79a of the serving microservice. The counter 86, and therefore the session specific counter value will not be accessible to the microservice 5b.

In an illustrative example, the microservice transmitting the message with the cookie (Microservice 5b in FIGS. 5a-5c) has access to a further cookie specific counter 88, stored, for example, at the security database 80. The message with the cookie includes a cookie specific counter value generated by the cookie specific counter 88. The client device receiving the message with the cookie specific counter value can then check the cookie specific counter value to determine whether it has been used before. If it is determined that the cookie specific counter value has been used before then the client device may determine not to respond to the challenge thereby protecting against an attack by a 3rd party.

In embodiments the challenge response exchange will be a stateless exchange, whereby the microservice transmits the message with the cookie and shuts down without creating a security state. The microservice includes address data in the message for a microservice which the client device should transmit the response to challenge. The microservice that receives the response to the challenge will then obtain the security state to communicate with the client device 72 (e.g. from the microservice currently service the client device or the security database 80) only after the response has been validated. Such functionality means that a security state will not be obtained at the microservice transmitting the message, and such a security state will only be obtained after receiving the valid response to the challenge thus reducing the burden on storage.

Although the description above generally describes the secure communications being provided by a TLS/DTLS exchange between the client device and microservice, where the client device may be a TLS/DTLS client device and the microservice may be provided on a TLS/DTLS server the claims are not limited in this respect. For example, the client device and server may use EDHOC to negotiate or generate various security parameters for a secure communications session.

As an illustrative example FIG. 6 shows a microservice architecture 100 in accordance with the present techniques whereby client device 102 is a client device (e.g. CoAP device) which communicates with microservices 5a/5b (e.g. a CoAP server) using the Object Security for Constrained RESTful environments (OSCORE) protocol, with end-to-end security being provided by security parameters negotiated using EDHOC. Using OSCORE/EDHOC the client device 102 and microservice 105 establish a security context comprising a common context, sender context and recipient context. The microservice also provides a connection identifier in the form of a security context identifier (SCID) to allow the client device identify the security context, and therefore the security parameters required to secure the messages. The security context may be stored in a security parameter database 112 accessible by the microservice serving the device.

The microservice architecture 100 further comprises a security database 112 which registers a mapping between the SCID and the microservice currently serving the client device. The security database 112 may communicate with the microservices to receive updates of the mappings therein, and to receive and respond to queries about the mappings therein.

Thus, when the client device 104 uses OSCORE/EDHOC to protect messages the client device generates a message comprising a header having a payload (a), SCID (o) and address data (c) (e.g. URI).

The router resource 104 routes the message 104 to the appropriate destination microservice in accordance with state data.

When a microservice receives a message with a SCID which indicates that another microservice is serving the client device it can, for example, request (e.g. from the microservice currently serving the client device or the database 112) the security parameters to communicate with the client device. Alternatively, the routing information at the router resource may be updated such that any future messages with the address data (c) are routed to the microservice 5a. In an embodiment the microservice that receives the message with the SCID can transmit update data to the router resource, wherein the update data identifies the server resource currently serving the client device. The claims are not limited in this respect and any resource (e.g. the microservice currently serving the client device or the security parameter database) can transmit the update data.

Although a microservice architecture is described above, the techniques may equally apply to any server resource (e.g. server, service, application).

Although the router resource is described as a load balancer in the examples described above, the claims are not limited in this respect and the router resource may be any hardware or software resource capable of routing or distributing messages from a source (e.g. device) to a destination (e.g. server, service, microservice, application etc). Such a router resource may be a proxy, a gateway, a server etc.

Embodiments of the present techniques also provide a non-transitory data carrier carrying code which, when implemented on a processor, causes the processor to carry out the methods described herein.

The techniques further provide processor control code to implement the above-described methods, for example on a general-purpose computer system or on a digital signal processor (DSP). The techniques also provide a carrier carrying processor control code to, when running, implement any of the above methods, in particular on a non-transitory data carrier or on a non-transitory computer-readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A computer implemented method for establishing a secure communication session between a client device and a first server resource, the method comprising:
   receiving, at the first server resource from a router resource, a message originating from the client device;
   determining, at the first server resource based on the content of the message, whether one or more security parameters required to serve the client device are available thereto;
   when the security parameters are not available:
      obtaining, at the first server resource, the one or more security parameters including receiving the one or more security parameters from a further resource;
   establishing a secure communication session between the first server resource and the client device using the obtained security parameters.

2. The method of claim 1, further comprising:
   determining, at the first server resource, the identity of a second server resource currently serving the client device.

3. The method of claim 2, wherein determining, at the first server resource, the identity of the second server resource currently serving the client device comprises:
   transmitting, from the first server resource to a further resource, a query communication comprising a connection identifier; and
   receiving, from the further resource, a response confirming the identity of the second server resource based on or in response to the connection identifier.

4. The method of claim 2 further comprising:
   transmitting, from the first server resource to the second server resource, a query to confirm that the message is valid.

5. The method of claim 2, wherein obtaining the one or more security parameters comprises:
   receiving the one or more security parameters directly from the second server resource.

6. The method of claim 1, further comprising:
   storing the one or more security parameters at a security parameter database accessible to the first server resource.

7. The method of claim 1, further comprising:
   transmitting, from the first server resource to the client device, a message comprising a challenge.

8. The method of claim 7, wherein the message comprising the challenge comprises a cookie.

9. The method of claim 8, further comprising:
   obtaining, at the first server resource, the cookie from the second server resource or from the further resource.

10. The method of claim 8, further comprising:
    generating, at the first server resource, the cookie.

11. The method of claim 8, wherein the cookie comprises a cookie specific counter value.

12. The method of claim 7, further comprising:
    receiving, at the first server resource from the client device, a response to the challenge.

13. The method of claim 12, further comprising:
    validating, at the first server resource, the response to the challenge.

14. The method of claim 13, further comprising:
    obtaining, at the first server resource, the one or more security parameters when the response to the challenge is validated.

15. The method of claim 12, further comprising:
    transmitting, from the first server resource to the second server resource or the further resource, the response to the challenge for validation.

16. A computer implemented method for establishing a secure communication session between a client device and a first server resource, the method comprising:
    receiving, at the first server resource from a router resource, a message originating from the client device;
    determining, at the first server resource, based on the content of the message, whether security parameters required to serve the client device are available thereto;
    when the security parameters are not available:
       determining, at the first server resource, the identity of the server resource currently serving the client device;
    transmitting update data to the router resource identifying the server resource currently serving the client device.

17. A computer implemented method for establishing a secure communication session between a client device and a first server resource, the method comprising:
    receiving, at the first server resource from a router resource, a message originating at the client device;
    determining, at the first server resource, based on the content of the message, whether security parameters required to serve the client device are available thereto;
    when the security parameters are not available:
       determining, at the first server resource, the identity of the server resource currently serving the client device;

transmitting, from the first server resource to the server resource currently serving the client device at least a portion of the content of the message to allow the server currently serving the device to respond to the message.

* * * * *